US008244258B2

(12) United States Patent
Hori

(10) Patent No.: US 8,244,258 B2
(45) Date of Patent: Aug. 14, 2012

(54) VOIP COMMUNICATION CONTROL METHOD AND ACCESS POINT APPARATUS

(75) Inventor: Masato Hori, Kanagawa (JP)

(73) Assignee: NEC Infrontia Corporation, Kanagawa (JP)

(*) Notice: Subject to any disclaimer, the term of this patent is extended or adjusted under 35 U.S.C. 154(b) by 1365 days.

(21) Appl. No.: 11/766,181

(22) Filed: Jun. 21, 2007

(65) Prior Publication Data

US 2007/0297368 A1  Dec. 27, 2007

(30) Foreign Application Priority Data

Jun. 23, 2006  (JP) ................ 2006-173806

(51) Int. Cl.
H04W 40/00 (2009.01)
H04W 4/00 (2009.01)

(52) U.S. Cl. .......... 455/445; 455/435.1; 455/453; 455/552.1; 370/338

(58) Field of Classification Search .......... 370/326–331, 370/238, 338, 342, 348; 455/41.2, 450–453.1, 455/442, 445, 434, 435.1, 422.1, 552.1
See application file for complete search history.

(56) References Cited

U.S. PATENT DOCUMENTS

| 7,941,122 B2* | 5/2011 | Dowek et al. ........... 455/411 |
| 2002/0061748 A1* | 5/2002 | Nakakita et al. ........ 455/435 |
| 2003/0134642 A1* | 7/2003 | Kostic et al. ........... 455/450 |
| 2004/0008627 A1 | 1/2004 | Garg et al. |
| 2004/0264488 A1* | 12/2004 | Yoon et al. ............. 370/412 |
| 2005/0147073 A1* | 7/2005 | Hietalahti et al. ....... 370/338 |
| 2005/0243719 A1 | 11/2005 | Haverinen et al. |
| 2006/0153122 A1* | 7/2006 | Hinman et al. ......... 370/328 |
| 2006/0240828 A1* | 10/2006 | Jain et al. .............. 455/436 |
| 2007/0201403 A1* | 8/2007 | Thome ................. 370/331 |
| 2009/0116500 A1* | 5/2009 | Thome ................. 370/401 |

FOREIGN PATENT DOCUMENTS

| JP | 2003-124939 A | 4/2003 |
| JP | 2005-136660 A | 5/2005 |
| JP | 2005-229591 A | 8/2005 |

OTHER PUBLICATIONS

Qian Yi et., al. "A Call Admission Control Framework ofr Voive over WLAN's", IEEE Wireless Communications, Feb. 2006, pp. 44-50.
Australian Notice of Acceptance dated Nov. 16, 2011 issued by the Australian Patent Office in counterpart Australian Application No. 2007202859.
Chen X, at al., "Survey on QoS Management of VOIP", Proceedings of the 2003 international conference on computer networks and mobile computing (ICCNMC '03).

(Continued)

Primary Examiner — George Eng
Assistant Examiner — Sarwat Chughtai
(74) Attorney, Agent, or Firm — Sughrue Mion, PLLC

(57) ABSTRACT

A critical threshold value of the number of connections of VoIP communication by a wireless LAN is set to an access point apparatus. The access point apparatus records identification information of terminals each of which has transmitted a request for connection of VoIP communication. After the number of terminals whose identification information have been recorded reaches the critical threshold value, the access point apparatus transmits a packet indicating release an association to a terminal whose identification information is newly recorded.

9 Claims, 5 Drawing Sheets

OTHER PUBLICATIONS

Extended European Search Report dated Apr. 5, 2012 issued by the European Patent Office in counterpart European Application No. 07110643.9.

Bazzi, et al. "WLAN Call Admission Control Strategies for Voice Traffic over Integrated 3G/WLAN Networks", Consumer Communications and Networking Conference, Jan. 8, 2006, pp. 1234-1238.

* cited by examiner

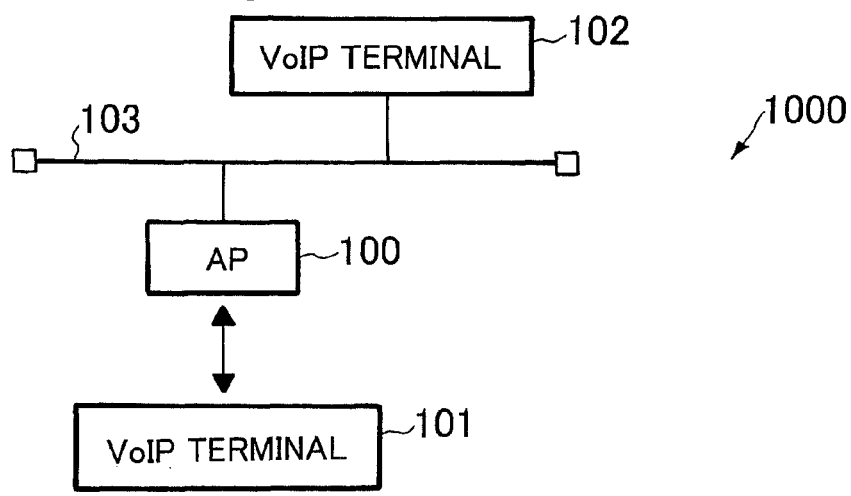
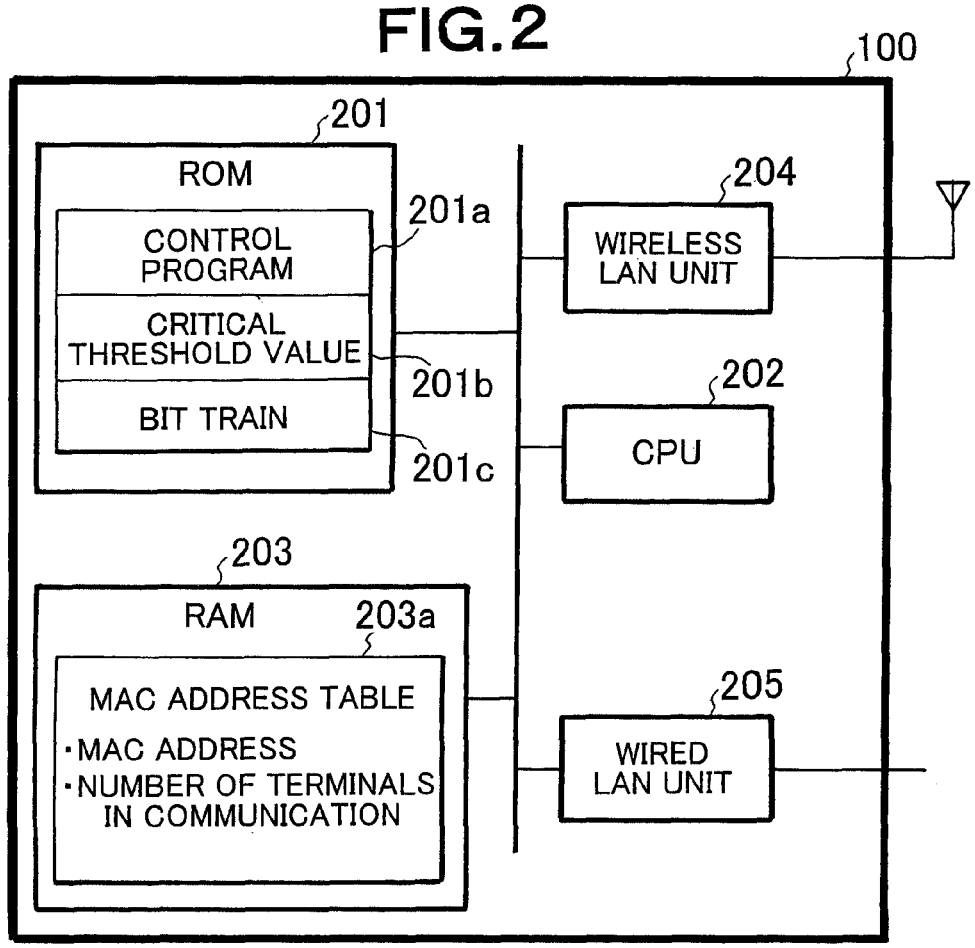

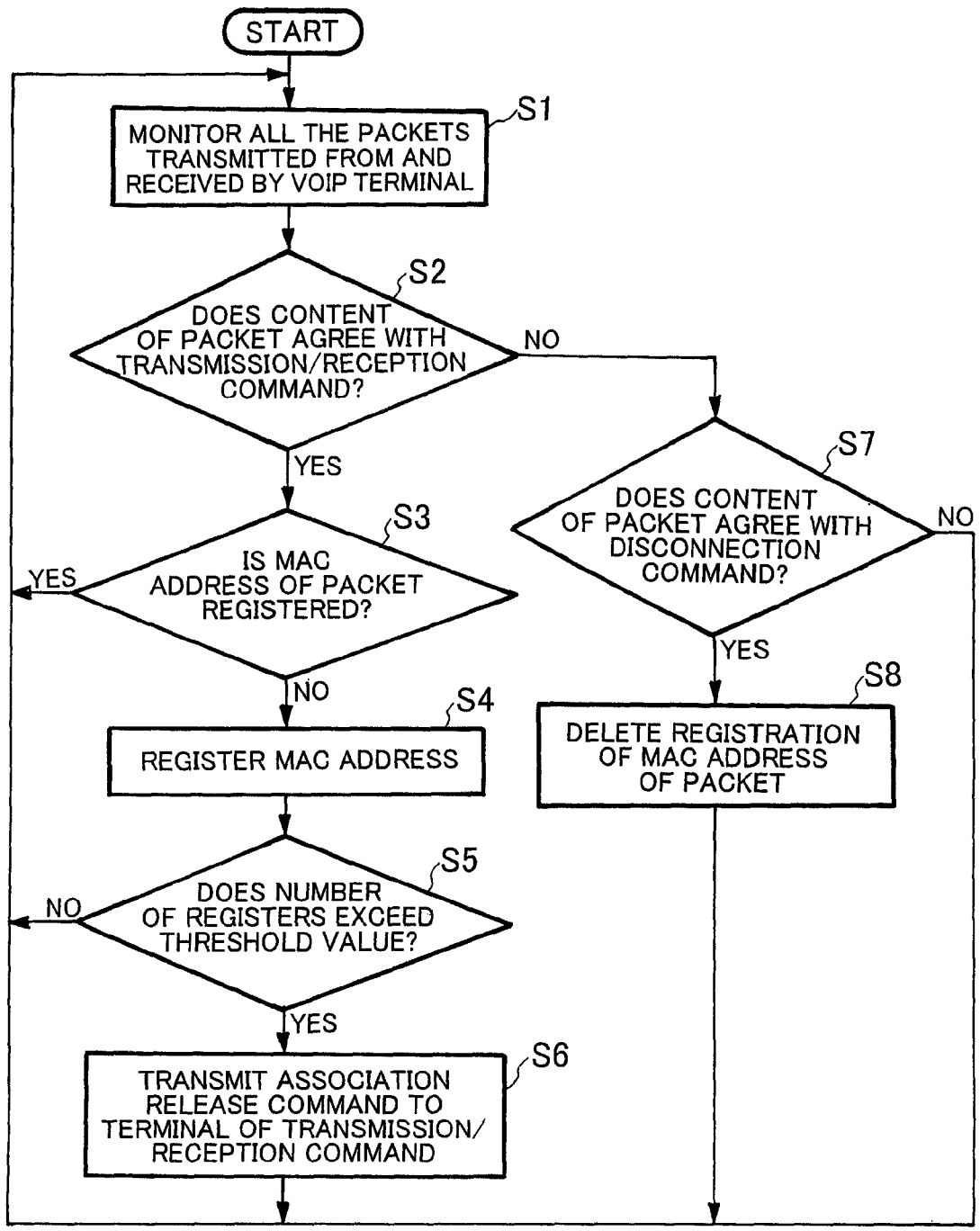

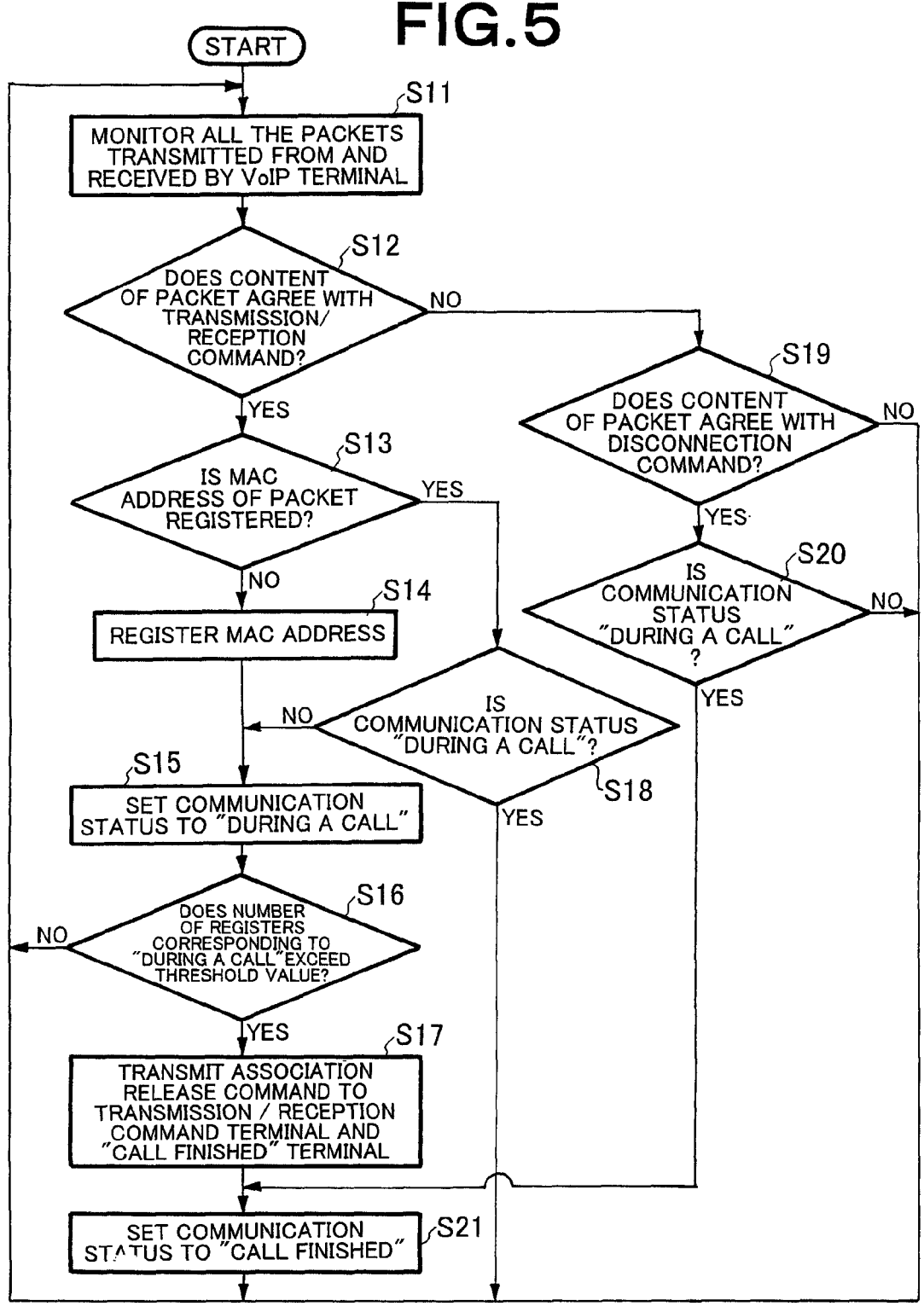

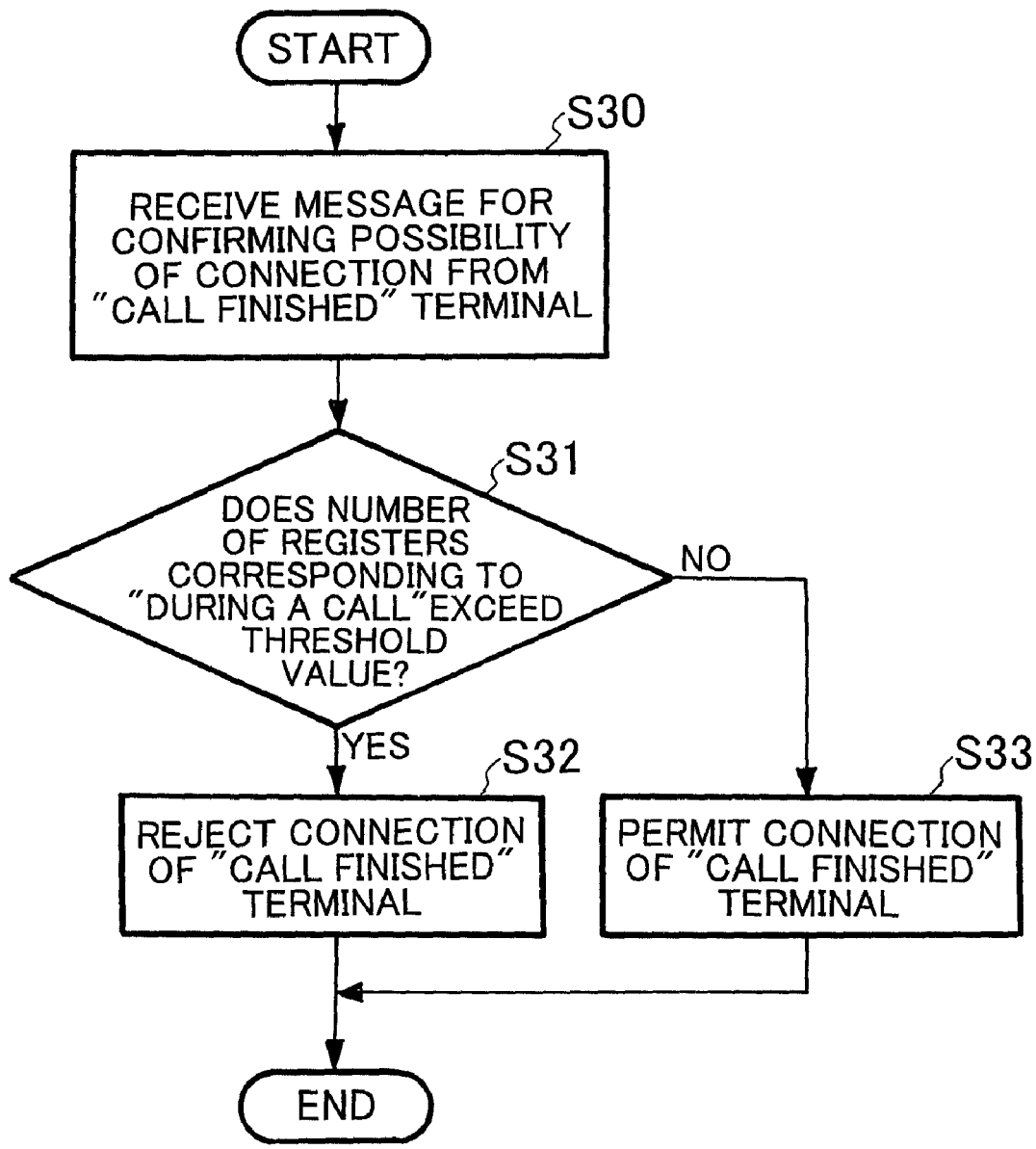

VOIP COMMUNICATION CONTROL METHOD AND ACCESS POINT APPARATUS

This application is based upon and claims the benefit of priority from Japanese patent application No. 2006-173806, filed on Jun. 23, 2006, the disclosure of which is incorporated herein in its entirety by reference.

BACKGROUND OF THE INVENTION

1. Field of the Invention

The present invention relates to a technology for controlling a VoIP communication, and more particularly, to a technology for controlling the number of connections to a VoIP communication making use of a wireless LAN.

2. Description of the Related Art

Recently, as a wireless LAN has become widespread, an opportunity for carrying out a real time communication such as a VoIP (Voice Over IP) communication and the like through the wireless LAN has increased.

As a technology for controlling a communication through the wireless LAN, there is a technology disclosed in, for example, Japanese Patent Application Laid-Open No. 2003-124939 which discloses a system for a plurality of client's computers to carry out a wireless communication through one access point apparatus. The access point apparatus of the system restricts the number of connections of client's computers by registering the MAC addresses of the client's computers which request the access point apparatus to be connected to them. When there are requests for connection exceeding the upper limit of the number of connections, the access point apparatus retries a registration processing until a registration possible state is established again.

The method disclosed in Japanese Patent Application Laid-Open Publication No. 2003-124939 improves the communication performance of the system by restricting the number of connections of the client's computers. However, when requests for connection exceeding the upper limit of connection are issued, the access point apparatus continuously retries the registration processing until a space for registration becomes available. Thus, in the above method, it is difficult to reduce the load applied to the access point apparatus. In particular, when the access point apparatus receives a plurality of requests for connection in a state that the upper limit of connection is exceeded, the access point apparatus becomes overloaded with a result that communication quality is deteriorated. Further, since clients must wait while the access point apparatus continuously makes the retry, there is also a disadvantage in that user-friendliness is lost.

Accordingly, an object of present invention, which was made to overcome the above problems, is to provide a technology for effectively controlling the connection of a VoIP communication in a wireless LAN system.

SUMMARY OF THE INVENTION

To solve the above problems, a VoIP communication control method of the present invention comprising: setting a critical threshold value of the number of connections of VoIP communication through an access point apparatus by a wireless LAN; recording identification information of terminals each of which has transmitted a request for connection of VoIP communication; and transmitting a packet indicating release an association from the access point apparatus to a terminal whose identification information is newly recorded after the number of terminals whose identification information have been recorded reaches the critical threshold value.

According to the present invention, a processing carried out by the access point apparatus to restrict the number of connections of the VoIP communication can be simplified. This is because when the access point apparatus receives a request for connection from a terminal in a state that the number of connections of the VoIP communication exceeds an upper limit, it is sufficient for the access point apparatus to notify the terminal to release the association. With this operation, the access point apparatus can be prevented from being overloaded. Further, the terminal can instantly recognize that the VoIP communication is not established by the notification for releasing the association.

As described above, in the present invention, a high quality VoIP call can be carried by a specific number of terminals by controlling the number of calls carried out by VoIP terminals by an access point.

BRIEF DESCRIPTION OF THE DRAWINGS

FIG. 1 is an arrangement view of a wireless LAN system to which the present invention is applied;

FIG. 2 is a detailed arrangement view of a wireless LAN access point of an embodiment 1;

FIG. 3 is a flowchart explaining an operation of the embodiment 1;

FIG. 5 is a flowchart explaining an operation of the embodiment 2; and

FIG. 6 is a flowchart explaining an operation of an embodiment 3.

DESCRIPTION OF THE PREFERRED EMBODIMENTS

Figure 4:
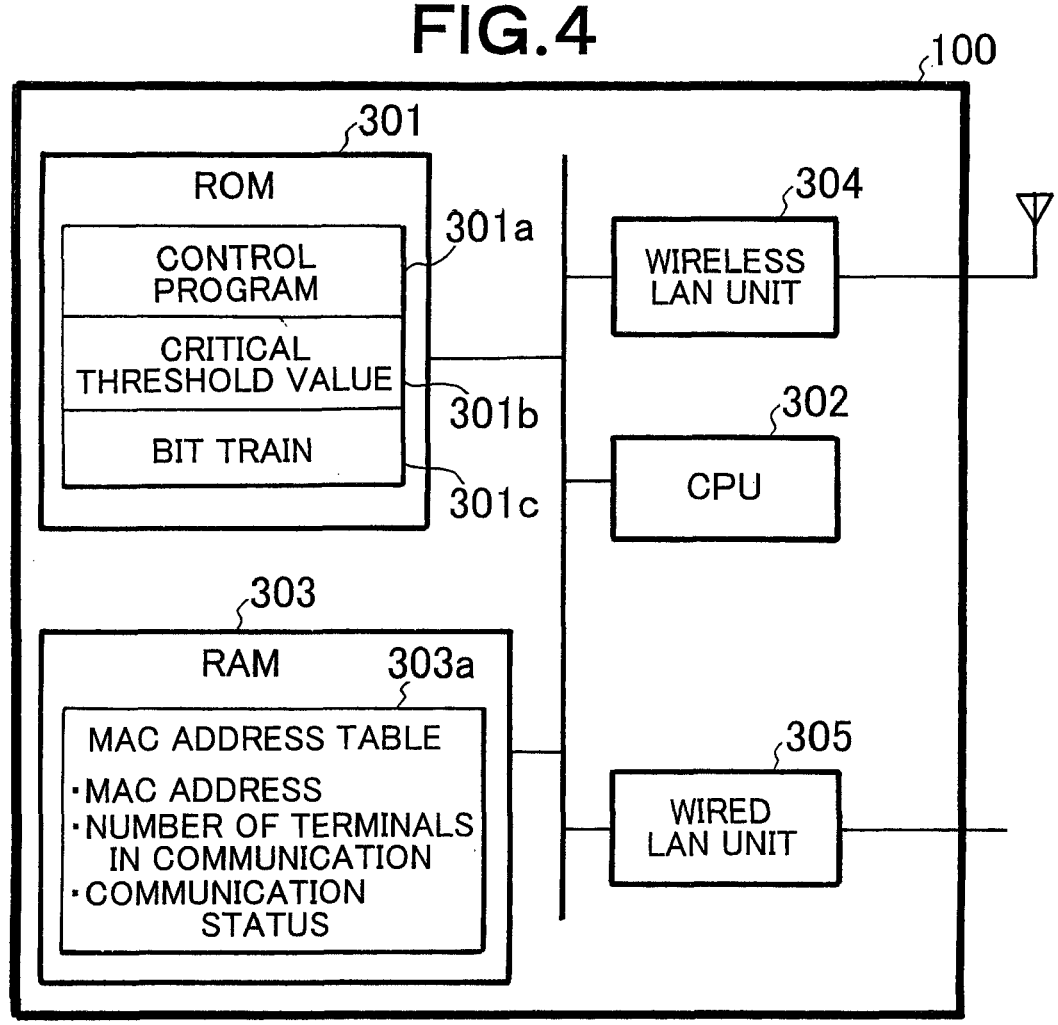
FIG. 4 is a detailed arrangement view of a wireless LAN access point of an embodiment 2.

A best mode of the present invention will be explained with reference to the drawings.

In a wireless LAN system, a system composed of one access point and a terminal that communicates with the access point is called a basic service set. A connection network for connecting basic service sets with each other is called a distribution system.

In the basic service set, a procedure for causing terminals to belong to an access point is called an association. A management list of the terminals belonging to the access point is created by the association. Since the list is supplied to the distribution system, a terminal can communicate with other terminal and other system through the access point. It is called disassociation to release the association.

Embodiment 1

FIG. 1 shows an arrangement of a system to which the present invention is applied. The system 1000 includes an access point (AP) 100 operated under the control of a program and VoIP terminals 101 and 102 which can communicate with each other.

The AP 100 is a wireless LAN access point apparatus for controlling the number of connections of VoIP terminals to be connected to a wireless LAN. The VoIP terminal 101 is a VoIP terminal acting as a wireless LAN client and connected to the AP 100 by the wireless LAN. The VoIP terminal 102 is connected to the AP 100 through a wired LAN 103 and can carries out a VoIP call to the VoIP terminal 101.

FIG. 2 shows a detailed arrangement of the AP 100 of the embodiment 1. The AP 100 includes a ROM 201, a CPU 202, a RAM 203, a wireless LAN unit 204, and a wired LAN unit 205.

The ROM 201 includes a control program 201a executed by the CPU 202, a critical threshold value 201b as set data used to execute the program, and a bit train 201c. Although the critical threshold value 201b and the bit train 201c may be previously written to the control program 201a, it may be written by a person in charge of an engineering work independently of the program. The CPU 202 carries out an arithmetic operation processing for controlling the number of VoIP calls and the like by executing the control program 201a. The RAM 203 acts as the working area of the CPU 202. Further, the RAM 203 has a MAC address table 203a for recording the number of connections of the VoIP terminal. The CPU 202 records the MAC addresses of the terminals to be connected and the number of terminals in communication at the time to the MAC address table 203a. The wireless LAN unit 204 takes charge of a wireless LAN communication function based on IEEE 802.11. The wired LAN unit 205 takes charge of a wired LAN communication function based IEEE 802.3.

An operation of the embodiment 1 will be explained with reference to the flowchart of FIG. 3. In this explanation, SIP (Session Initiation Protocol) is applied as a call control protocol for carrying out a VoIP communication for the purpose of convenience. Other call control protocols such as H.323, MGCP (Media Gateway Control Protocol), and the like may be applied in place of SIP.

The AP 100 monitors all the packets transmitted from and received by the VoIP terminal 101 connected to the wireless LAN (step S1).

The AP 100 determines whether or not the content of description of a packet being monitored agrees with the transmission/reception command included in the bit train 201c of the ROM 201 (step S2). In the SIP, the transmission/reception command corresponds to an INVITE command which is used as a transmission command and a reception command for requesting connection of the VoIP communication.

When the content of the packet is the INVITE command as a result of determination (step S2: Yes), the AP 100 confirms whether or not the MAC address of the VoIP terminal 101 included in the packet exists in the MAC address table 203a of the RAM 203 (step S3).

When the MAC address of the target is already registered to the MAC address table 203a as the result of determination (step S3: Yes), the process goes to a processing of other packet to be monitored. When the MAC address is not yet registered (step S3: No), the AP 100 registers the MAC address of the VoIP terminal 101 included in the packet to the MAC address table 203a (step S4).

The AP 100 determines whether or not the number of MAC addresses registered to the MAC address table 203a, that is, the number of VoIP calls at the time exceeds the preset critical threshold value 201b (step S5). The critical threshold value 201b is an upper limit value prescribed to the AP 100 as to the number of connections of the VoIP calls.

When the number of the registered MAC addresses does not exceed the critical threshold value 201b as a result of determination, (step S5: No), the process goes to a processing of other packet to be monitored. When the number of the registered MAC addresses exceeds the critical threshold value 201b (step S5: Yes), the AP 100 transmits a Dis-Association command determined by IEEE 802.11, that is, a command indicating to release the association to the VoIP terminal 101 acting as the transmission source or the transmission destination of the INVITE command (step S6). The VoIP terminal 101 that receives the Dis-Association command is disconnected from wireless LAN.

In case the VoIP terminal 101 is disconnected from wireless LAN, the VoIP communication of the VoIP terminal 101 is not established. After transmitting the Dis-Association command, the AP 100 deletes the MAC address which registered to the MAC address table 203a as to the VoIP terminal 101.

When the content of description of the packet being monitored does not agree with the transmission/reception command (step S2: No), the AP 100 determines whether or not the content of description agrees with a disconnection command ("BYE") included in the bit train 201c of the ROM 201 (step S7).

When the content of description of the packet does not also agree with the disconnection command as a result of determination (step S7: No), the process goes to a processing of other packet to be monitored. When the content of description of the packet agrees with the disconnection command (step S7: Yes), the AP 100 recognizes that the VoIP communication of the VoIP terminal 101 has finished and deletes the MAC address of the VoIP terminal 101 from the MAC address table 203a (step S8).

Embodiment 2

FIG. 4 shows a detailed arrangement of an AP 100 of a second embodiment. FIG. 5 is a flowchart showing an operation of the AP 100 of the second embodiment. Although the AP 100 of the second embodiment is fundamentally has the same arrangement as that of the embodiment 1 described above (FIG. 2), it is different from the embodiment described above in that a call status is added to a MAC address to show a call status of a VoIP terminal. The MAC address table 303a has "during a call" or "call finished" recorded thereto as the call status of the terminal.

The operation of the second embodiment will be explained referring to the flowchart of FIG. 5.

The AP 100 monitors all the packets transmitted from and received by a VoIP terminal 101 connected to a wireless LAN (step S11).

The AP 100 determines whether or not the content of description of a packet being monitored agree with a transmission/reception command ("INVITE") included in a bit train 301c of a ROM 301 (step S12).

When the description of the packet agrees with the INVITE command as a result of determination (step S12: Yes), the AP 100 confirms whether or not the MAC address of the VoIP terminal 101 included in the packet exists in a MAC address table 303a of a RAM 303 (step S13).

When the MAC address of the target is already registered to the MAC address table 303a as a result of determination (step S13: Yes), the AP 100 determines whether or not the call status associated with the MAC address is "during a call" (step S18).

When the call status is "during a call" as a result of determination (step S18: Yes), the process goes to a processing of other packet to be monitored. Further, when the call status is "call finished" (step S18: No), the AP 100 changes the call status of the VoIP terminal 101 to "during a call" in the MAC address table 303a (step S15).

In contrast, when the MAC address of the target is not yet registered to the MAC address table 303a (step S13: No), the AP 100 associates the MAC address with the call status of "during a call" and registers them to the MAC address table 303a (steps S14, S15).

The AP 100 determines whether or not the number of MAC addresses associated with the call status of "during a call", that is, the number of terminals in a VoIP call exceeds a critical threshold value 301b in the MAC address table 303a (step S16). The critical threshold value 301b used in the determination may be the same as or different from the critical threshold value 201b of the embodiment 1.

When the number of VoIP calls does not exceed the critical threshold value 301b as a result of determination (step S16: No), the process goes to a processing of other packet to be monitored. When the number of calls exceeds the critical threshold value 301b (step S16: Yes), the AP 100 transmits a Dis-Association command indicating to release an association to the VoIP terminal 101 acting as a transmission source or a transmission destination of the INVITE command and to the VoIP terminal 101 whose call status is "call finished" (step S17). In this case, the terminal to which "call finished" is recorded is a terminal which carried out a VoIP call in the past but does not carry out a VoIP call at this time as well as which is in the state that a communication session with the AP 100 is continued. The VoIP terminal 101 which receives the Dis-Association command is disconnected from a wireless LAN.

The AP 100 changes the call status of the VoIP terminal 101, which is disconnected from wireless LAN after the call status of it is set to "during a call", to "call finished" (step S21).

When the content of description of the packet being monitored does not agree with the transmission/reception command (step S12: No), the AP 100 determines whether or not the content of description thereof agrees with a disconnection command ("BYE") included in the bit train 301c of the ROM 301 (step S19).

When the content of description of the packet does not also agree with the disconnection command (step S19: No), the process goes to a processing of other packet to be monitored. When the content of description of the packet agree with the disconnection command (step S19: Yes), the AP 100 determines whether or not the call status of the VoIP terminal is "during a call" (step S20).

When the call status is "call finished" as a result of determination (step S20: No), the process goes to a processing of other packet to be monitored. Further, when the call status is "during a call" (step S20: Yes), the AP 100 changes the call status of the VoIP terminal to "call finished" (step S21).

As described above, in the second embodiment, when the number of connections of the terminals in the AP 100 exceeds the critical threshold value, not only a terminal, which intends to newly start a VoIP call, but also a "call finished" terminal, which is being connected to the wireless LAN, are disconnected from the wireless LAN. With this operation, the "call finished" terminal can be prevented from resuming a VoIP call.

Note that since a terminal, which is connected to the wireless LAN regardless that it is not a VoIP terminal, is not disconnected therefrom in the second embodiment, it can carry out a data communication.

Embodiment 3

FIG. 6 is a flowchart explaining an operation of a third embodiment. The third embodiment relates to a control of an AP 100 when a "call finished" VoIP terminal, which is disconnected in the second embodiment, newly issues a request for connection.

An operation of the third embodiment will be explained referring to the flowchart of FIG. 6.

When the AP 100 receives a message for confirming possibility of connection such as "Association Request" based on IEEE 802.11 or "Probe Request" from a "call finished" VoIP terminal in a MAC address table 303a (step S30), the AP 100 determines whether or not the number of "during a call" MAC addresses, that is, the number of terminals in a call at the time exceeds a critical threshold value 301b (step S31).

When the number of terminals in a call at the time exceeds the critical threshold value as a result of determination (step S31: Yes), the AP 100 rejects the request for connection (step S32). Specifically, the AP 100 ignores "Association Request" or "Probe Request" transmitted from the VoIP terminal.

When the number of terminals in a call at the time does not exceed the critical threshold value (step S31: No), the AP 100 permits connection of the VoIP terminal to the wireless LAN (step S33).

According to the third embodiment, even if the "call finished" VoIP terminal, which is disconnected from the wireless LAN in the second embodiment tries new connection, it is possible to control the terminal such that it is not connected to the same access point again as long as the number of VoIP calls exceeds the critical threshold value.

The present invention can be applied to a streaming communication such as VoIP, a moving image communication, and the like in the wireless LAN system based on IEEE 802.11. The present invention can be also applied to an on-demand delivery service antenna for delivering music and moving images from the Internet. Further, the present invention can be also applied to a radio communication other than IEEE 802.11.

Although the exemplary embodiments of the present invention have been described in detail, it should be understood that various changes, substitutions and alternatives can be made therein without departing from the sprit and scope of the invention as defined by the appended claims. Further, it is the inventor's intent to retrain all equivalents of the claimed invention even if the claims are amended during prosecution.

What is claimed is:

1. A Voice Over Internet Protocol (VoIP) communication control method executed by an access point apparatus comprising a wireless local area network (LAN) unit configured to make an association with a VoIP terminal and a memory, in which a threshold value indicating a maximum number of VoIP connections to the wireless LAN unit is stored, the method comprising:

storing, in a connection manager, identification information of at least one terminal having an association with the wireless LAN unit, a number of terminals having associations with the wireless LAN unit, status information which indicates a call status of the at least one terminal having the identification information, the status information being changed from a calling status that indicates a call in progress to a call finished status that indicates a completed call in response to a request for VoIP disconnection transmitted from the at least one terminal, and the status information being changed from the call finished status to the calling status in response to a request for VoIP connection transmitted from the at least one terminal; and transmitting a release packet indicating release of the association from the wireless LAN unit to an object terminal when the number of terminals having associations with the wireless LAN unit exceeds the threshold value in response to the object terminal requesting VoIP communication and identification information of the object terminal is stored in the connection manager to establish association between the object terminal and the wireless LAN unit, wherein the status information of the object terminal is changed to the calling status when the object terminal requests VoIP communication, and the release packet is transmitted to the object terminal when the number of terminals having status information indicating the calling status exceeds the threshold value.

2. A VoIP communication control method of claim 1, further comprising:
deleting the identification information of the object terminal from the connection manager when the release packet is transmitted to the object terminal.

3. A VoIP communication control method of claim 1, wherein the release packet is transmitted to a terminal having status information which is newly changed to the call finished status when the number of terminals having status information indicating the calling status exceeds the threshold value.

4. A VoIP communication control method of claim 1, wherein the identification information includes a MAC address of the corresponding terminal; and
wherein the release packet includes a Dis-Association packet based on IEEE 802.11.

5. An access point apparatus comprising:
a wireless local area network (LAN) unit configured to make an association with a Voice Over Internet Protocol (VoIP) terminal;
a memory in which a threshold value indicating a maximum number of VoIP connections to a wireless LAN unit is stored;
a connection manager configured to store identification information of at least one terminal having an association with the wireless LAN unit, a number of terminals having associations with the wireless LAN unit, status information which indicates a call status of the at least one terminal being having the identification information, the status information being changed from a calling status that indicates a call in progress to a call finished status that indicates a completed call in response to a request for VoIP disconnection from the at least one terminal, and the status information being changed from the call finished status to the calling status in response to a request for VoIP connection transmitted from the at least one terminal; and
a controller configured to cause the wireless LAN unit to transmit a release packet indicating release of an association to an object terminal when the number of terminals having association with the wireless LAN unit exceeds the threshold value in a case where the object terminal requests VoIP connection and the connection manager stores identification information of the object terminal to establish association between the object terminal and the wireless LAN unit,
wherein the status information of the object terminal is changed to the calling status when the object terminal requests VoIP communication, and
the controller causes the wireless LAN unit to transmit the release packet to the object terminal when the number of terminals having status information indicating the calling status exceeds the threshold value.

6. An access point apparatus of claim 5, wherein the controller deletes the identification information of the object terminal from the connection manager when the release packet is transmitted to the object terminal.

7. An access point apparatus of claim 5, wherein the controller causes the wireless LAN unit to transmit the release packet to a terminal having status information which is newly changed to the call finished status when the number of terminals having status information indicating the calling status exceeds the threshold value.

8. An access point apparatus of claim 5, wherein the identification information includes a MAC address of the corresponding terminal and the release packet includes a Dis-Association packet based on IEEE 802.11.

9. A wireless LAN system comprising:
an access point apparatus, and
an object terminal which requests Voice Over Internet Protocol (VoIP) communication with the access point apparatus,
the access point apparatus comprising:
a wireless local area network (LAN) unit configured to make an association with a VoIP terminal;
a memory in which a critical threshold value indicating a maximum number of VoIP connections to a wireless LAN unit is stored;
a connection manager configured to store identification information of at least one terminal having an association with the wireless LAN unit, a number of terminals having associations with the wireless LAN unit, status information which indicates a call status of the at least one terminal having the identification information, the status information being changed from a calling status that indicates a call in progress to a call finished status that indicates a completed call in response to a request for VoIP disconnection transmitted from the at least one terminal, and the status information being changed from the call finished status to the calling status in response to a request for VoIP connection transmitted from the at least one terminal; and
a controller configured to cause the wireless LAN unit to transmit a release packet indicating release of the association to an object terminal in a case where the number of terminals having associations with the wireless LAN unit exceeds the threshold value,
wherein the connection manager stores identification information of the object terminal to make an association between the access point apparatus and the object terminal,
the status information of the object terminal is changed to the calling status when the object terminal requests VoIP communication, and
the controller causes the wireless LAN unit to transmit the release packet to the object terminal when the number of terminals having status information indicating calling status exceeds the threshold value.

* * * * *